(No Model.)　　　　　　　H. LOBDELL.　　　　　2 Sheets—Sheet 1.
CURTAIN STICK.
No. 292,333.　　　　　　　　　　　Patented Jan. 22, 1884.
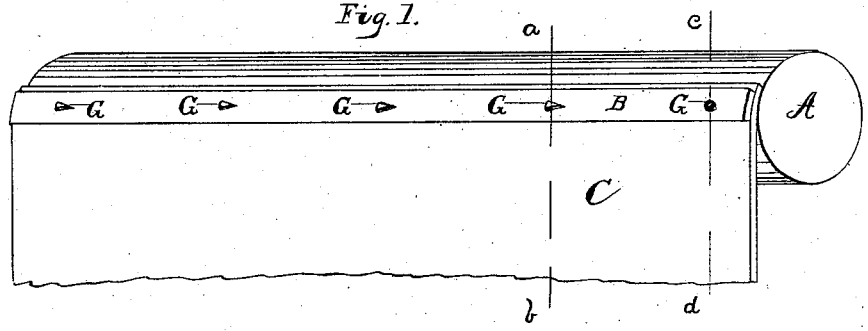
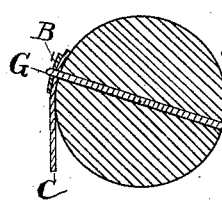 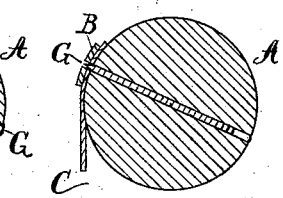 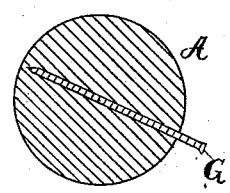 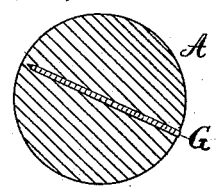
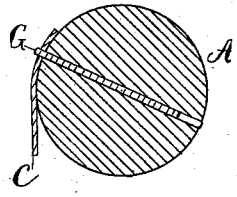 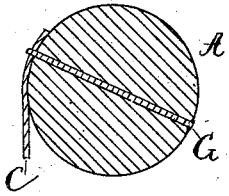
Witnesses:　　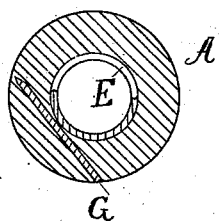　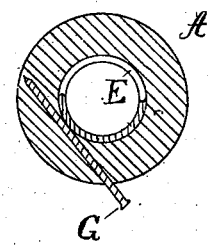　Inventor.

(No Model.) 2 Sheets—Sheet 2.
H. LOBDELL.
CURTAIN STICK.
No. 292,333. Patented Jan. 22, 1884.
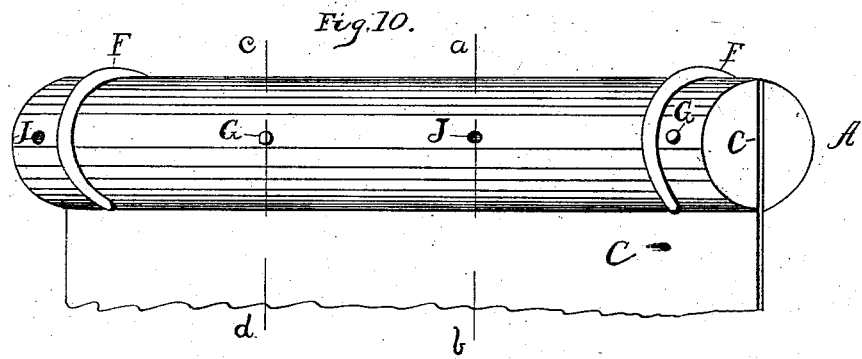
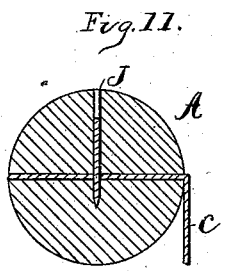 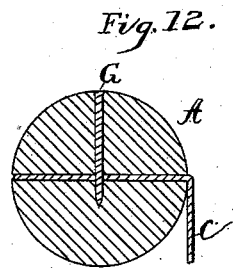 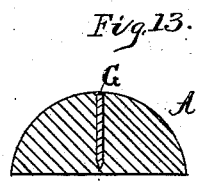 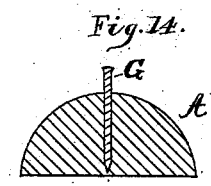
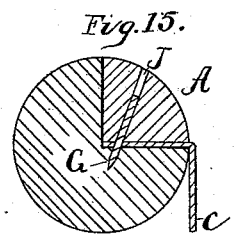 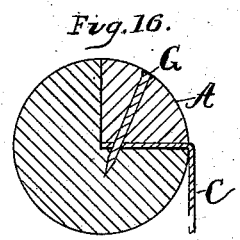 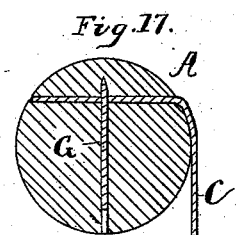 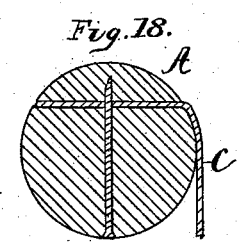
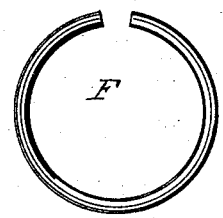
Witnesses:
A. H. Hollister
John T. Booth
Inventor:
H. Lobdell
by Geo. A. Mosher
Atty.

UNITED STATES PATENT OFFICE.

HENRY LOBDELL, OF TROY, NEW YORK.

CURTAIN-STICK.

SPECIFICATION forming part of Letters Patent No. 292,333, dated January 22, 1884.

Application filed October 23, 1883. (No model.)

*To all whom it may concern:*

Be it known that I, HENRY LOBDELL, a resident of the city of Troy, in the county of Rensselaer and State of New York, have invented certain new and useful Improvements in Curtain-Sticks; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

Similar letters refer to similar parts in the several figures therein.

My invention relates to improvements in curtain-sticks; and it consists in providing the stick with a row of nails or similar fasteners ranged longitudinally of the stick and partly driven only, so that the points of the nails or fasteners do not project from the stick.

The object of my invention is to provide a curtain-stick upon which a curtain may be easily and quickly adjusted and readjusted, and particularly to provide an improvement upon the curtain stick or roller described in Letters Patent of the United States granted to me October 2, 1883, for improvements in curtain-rollers, and numbered 286,027, in which I provided nails or fasteners with projecting points. When the points are allowed to project, they are liable to be bent in shipping and to injure other objects with which they may be brought in contact before being put in use.

Figure 1 of the drawings, which consist of two sheets, is a perspective view of a curtain-stick in the form of a roller with a curtain attached. Figs. 2 and 3 are cross-sections taken at broken lines *a b* and *c d* in Fig. 1. Figs. 4, 5, 6, 7, 8, and 9 are cross-sectional views, showing different methods of application. Fig. 10 is a perspective view of a curtain-stick in the form of a pole or inverted slat in sections. Figs. 11 and 12 are cross-sections taken at broken lines *a b* and *c d* in Fig. 10, after the stick has been given a quarter-turn. Figs. 13 and 14 are cross-sections of one section of the stick, showing two styles of fasteners. Figs. 15, 16, 17, and 18 are cross-sectional views, showing different methods of application.

Fig. 19 is a plan view of a ring employed to hold the sections of the stick together.

The curtain-roller A is provided with a nail, G, as shown in Figs. 4 and 5. In Fig. 4 the head of the nail is shown projecting, and the nail may be driven through the curtain-stick at any time by a blow upon its head. In Fig. 5 neither end of the nail is left projecting, and it may be drawn through by means of a nail-set or any similar implement, so that the point will project beyond the surface of the stick.

My invention consists in providing the curtain-stick with a row, G G G G, of nails or similar fasteners inserted in the sticks in their proper places, but not driven through so that their points shall project from the surface of the stick, but ready to be driven through, as shown in Figs. 4, 5, 8, 9, 13, and 14.

The curtain may be attached to the stick as follows: Press the stick down upon the end of the curtain to be attached in such a position that the stick shall extend across the curtain at right angles to its general line of direction, with the heads of the fasteners up. Drive some or all of the fasteners down through the curtain; then roll or turn the stick over and place the perforated metallic strip B upon the projecting points of the fasteners, so that the points will project up through the perforations, there being a perforation for each point, after which the points should be bent down or clinched, as shown in Figs. 1 and 2. When desired, the strip B may be dispensed with and the points bent down directly upon the curtain, as shown in Figs. 6 and 7.

When it is desired to apply my invention to spring curtain-rollers, the fasteners may be inserted at one side of the spring, as shown in Figs. 8 and 9, in which E represents the spring. The fasteners are driven through so as to project from the roller, and the curtain attached as in other cases.

Fasteners may be applied to sections of curtain-sticks in the same manner as to solid sticks, as shown in Figs. 13 and 14. The section A is placed upon the curtain end, to be attached in the manner before described, and the fasteners driven down through the curtain, when the other section of the stick is laid upon the first to cover the projecting points and curtain-edge, as shown in Figs. 11 and 12 and in perspective in Fig. 10. After the points have been driven through the curtain the curtain can be removed and easily readjusted upon the stick without changing the position of the fasteners.

When I apply my fasteners to sectional sticks, I prefer to fasten the sections with rings open on one side—such as shown in Fig. 19. After the two sections of the stick have been placed together, with the curtain attached between, two or more rings are slipped onto the stick, the curtain occupying the opening in the rings.

Instead of rings, screws may be used, when desired, to secure the two sections together.

It frequently happens that curtain-sticks warp, so that they are not straight; but this difficulty can generally be overcome by using a sectional stick, as I have described. The sections can be interchanged with one another and the ends reversed to produce, when fastened, a straight and perfect curtain-stick. Sticks made and provided with fasteners, as above described, form suitable curtain-poles and curtain-slats, the latter to be attached to the lower end of the curtain, as shown by Fig. 10, when the drawing is turned upside down.

The sections of the stick may be of any desired form or shape. One section may be three-quarters of a roller and the other section one-quarter, placed together as shown in Figs. 15 and 16, or the sections may be shaped and arranged as shown in Figs. 17 and 18.

The covering-section may be metallic, with apertures adapted to receive the points of the fasteners, similar to the metallic strip shown in Fig. 1.

The metallic strip B may be of sufficient thickness and the fasteners of suitable length to enter the perforations in the strip without projecting through the same, as shown in Fig. 3, thereby avoiding the necessity of clinching the fasteners upon the strip, the strip being fastened to the stick by screws, or by rings F, as shown.

I have shown the strip and curtain somewhat exaggerated in thickness. They may be thinner and the curtain-stick immediately beneath the strip rabbeted to secure a more even surface appearance.

I use the term "curtain-stick" as inclusive of curtain rollers, poles, and slats.

What I claim as new, and desire to secure by Letters Patent, is—

1. A curtain-stick provided with a row of curtain-fasteners extending longitudinally of said stick, said fasteners having pointed ends concealed within said stick, and adapted to be driven through said stick into a position to project therefrom, substantially as described, and for the purposes set forth.

2. A sectional curtain-stick, one of the sections or parts of which is provided with a row of curtain-fasteners extending longitudinally of said stick, said fasteners having pointed ends concealed within said section or part, and adapted to be driven through said part into a position to project therefrom, substantially as described, and for the purposes set forth.

3. A curtain-stick composed of two or more sections, and provided in one section with pointed curtain-fasteners, in combination with a curtain, and with a plurality of rings adapted to fit upon said stick, and provided with an opening on one side of each ring to contain the curtain, substantially as described, and for the purposes set forth.

In testimony whereof I have hereunto set my hand this 13th day of October, 1883.

HENRY LOBDELL.

Witnesses:
GEO. A. MOSHER,
W. H. HOLLISTER, Jr.